3,032,189
BENEFICIATION OF PHOSPHATIC ORES
Howard W. Adam, Gouverneur, N.Y., and Douglas H. Fenske, Lakeland, Fla., assignors to International Minerals & Chemical Corporation, a corporation of New York
No Drawing. Filed Nov. 17, 1958, Ser. No. 774,083
4 Claims. (Cl. 209—12)

This invention relates to a method of beneficiating phosphatic ores. More particularly, this invention relates to a method of preparing a high grate phosphate rock concentrate from low grade phosphatic ores containing relatively large proportions of iron and aluminum impurities.

Numerous ore dressing techniques have been employed heretofore for the treatment of phosphatic ores to produce a phosphate rock concentrate suitable for the preparation of phosphoric acid, triple superphosphate and other fertilizer materials. Specifications of the industry generally require a phosphate rock concentrate having a minimum proportion of bone phosphate of lime (BPL) of about 72% by weight and a maximum proportion of iron and aluminum of about 4% by weight, determined as ferric oxide and aluminum oxide. Phosphate rock concentrates having large proportions of iron and aluminum impurities are undesirable for use in the preparation of phosphoric acid, since the iron and aluminum are solubilized when the rock is reacted with sulfuric acid and appear as soluble impurities in the resulting phosphoric acid. In addition phosphate rock concentrates containing large proportions of iron and aluminum impurities are undesirable for use in the preparation of fertilizer materials such as triple superphosphate, since the iron and aluminum impurities are generally converted to phosphates in the process. Phosphates of iron and aluminum are not readily available to plants and therefore have little nutritional value.

Certain phosphatic ores such as are found in the Florida phosphate pebble field can be beneficiated economically by well known ore dressing techniques to produce a phosphate rock concentrate which meets the requirements of the industry with respect to the BPL content and the iron and aluminum content. However, certain other phosphatic ores, such as those found in Tennessee and the Senegal district of French West Africa, contain relatively high proportions of iron and aluminum and cannot be concentrated economically by conventional ore dressing techniques to produce a concentrate which meets the requirements of the industry.

It is an object of this invention to provide an improved method of beneficiating phosphatic ores.

Another object of this invention is to provide a method of recovering a phosphate rock concentrate low in silica and compounds of iron and aluminum from phosphatic ores.

Still another object of this invention is to provide an improved method of separating iron and aluminum impurities from phosphatic ores.

These and other objects of the invention will be apparent from the following detailed description of the invention.

Now it has been discovered that phosphatic ores which contain compounds of iron and aluminum disproportionately associated with the various components of the ore can be beneficiated in an aqueous medium to separate silica and then subjected to a high intensity magnetic separation to reduce the iron and aluminum content in the final concentrate. In the instant novel process, phosphatic ore is comminuted to liberate phosphatic values, and then slurried with water. The aqueous slurry of comminuted ore is beneficiated by screening, hydroclassification, froth flotation, spiraling operation, tabling operation, or a combination of these methods to remove a major portion of the silica and to produce a phosphate concentrate having an iron and aluminum content generally in excess of about 4% by weight as ferric oxide and aluminum oxide. This concentrate is dried and passed through a high intensity magnetic field to separate a major portion of the compounds of iron and aluminum, and to recover a phosphatic concentrate which is low in silica, iron and aluminum. Beneficiation of the phosphate ore followed by high intensity magnetic separation of the resulting concentrate results in a substantially improved recovery of phosphatic values as compared to a process where the comminuted ore is first subjected to a high intensity magnetic separation and the resulting non-magnetic fraction is then subjected to a beneficiation step such as flotation.

Any phosphatic ore containing high proportions of iron and aluminum can be beneficiated in accordance with the novel process. For example, phosphatic ores containing compounds of iron and aluminum, determined as the oxides, in excess of about 3.5% by weight, and containing in excess of about 50% BPL by weight are suitable. Typical examples of suitable phosphatic ores include Tennessee white phosphate rock, as found in Perry, Decatur and Johnson Counties in Tennessee; Tennessee brown phosphate rock, as found in Maury County and Williamson County in Tennessee; and African phosphate rock, as found in the Senegal district of French West Africa. The mined ore is first comminuted in a suitable apparatus such as a hammer mill, jaw crusher and the like to liberate phosphatic values contained in the ore. The particle size at which such liberation occurs will vary with the particular ore being treated, but the desired liberation is generaly accomplished by comminution of the ore to pass a screen having a mesh size between about 6 mesh and about 48 mesh. The comminuted ore is admixed with sufficient water to form a slurry of the order of between about 50 and about 75% solids by weight, and the slurry is subjected to vigorous agitation to disperse agglomerated particles that may be present.

The slurry is then subjected to a size separation step, such as hydroclassification and/or screening, whereby solids are separated into a coarse fraction, an intermediate fraction, and a fine fraction. Generally solids with the highest proportion of phosphate values are in the intermediate fraction. Therefore, coarse and fine fractions are separated from the desired intermediate fraction before subsequent treatment in order to obtain optimum recovery of phosphate values in the product. The maximum particle size of the intermediate fraction is between about 8 and about 48 mesh and preferably between about 12 and about 20 mesh. The minimum particle size of the intermediate fraction is between about 100 mesh and about 35 microns, and preferably between about 150 mesh and about 325 mesh.

Solid comprising the intermediate fraction, in aqueous slurry form, can be subjected to flotation, spiraling, tabling, or a combination of two or more of these operations to reduce the silica content. In one embodiment of the invention, the silica content of the intermediate fraction is reduced by means of flotation. Solids comprising the intermediate fraction, in aqueous slurry form, are admixed with a modifier, a basic reagent to adjust the pH above about 7.0, and either an anionic or cationic collector.

Examples of anionic or negative ion agents which may be used for the concentration of phosphatic material are the higher fatty acids (such as oleic, stearic and palmitic acids), natural resin acids, tall oil, naphthenic acids, alkyl sulfonated fatty acids, acid esters of high molecular weight aliphatic alcohols, and the soaps of such materials.

Anionic collectors are added in proportions to provide between about 0.8 and about 3.0 pounds of anionic collector per ton of solids. If an anionic collector is used, a major portion of the phosphate is concentrated and recovered in the froth, while a major portion of silica is depressed.

Examples of cationic or positive ion reagents which are useful in carrying out the concentration of phosphatic materials are nitrogenous positive ion agents such as the higher molecular weight aliphatic amines containing at least one alkyl group having 12 to 20 carbon atoms, and their water-soluble addition salts with mineral and organic acids, esters of amino alcohols with high molecular weight fatty acids, the higher alkyl-substituted isoureas and their water-soluble salts, high molecular weight aliphatic quaternary ammonium bases and their water-soluble salts, alkyl-substituted pyridinium and quinolinium water-soluble salts, and others. Cationic collectors are added in proportions to provide between about 0.15 and about 0.5 pound of cationic collector per ton of solids. If a cationic collector is used, a major portion of the phosphate is depressed, while a major portion of silica is removed in the froth.

Either inorganic or organic basic reagents may be used to adjust the pH of the slurry above 7. For example, inorganic basic materials such as caustic soda, caustic potash, alkali bicarbonates, such as $KHCO_3$ and $NaHCO_3$, alkali carbonates such as $Na_2CO_3$, $K_2CO_3$, $CaCO_3$ and other similar reagents are useful. Organic reagents, such as pyridine, low molecular weight amines, such as dimethylamine, ethylamine, isopropylamine, quinoline and similar reagents have been found to be useful. However, for reasons of economy, caustic soda or alkali carbonates are generally used to provide the proper pH adjustment.

Modifiers or extenders such as kerosene and fuel oil may also be used in the flotation operation, and are added in proportions to provide between about 2 and about 9 pounds of modifier per ton of solids. If desired, a frother such as pine oil, cresylic acid, eucalyptus oil, mixtures of aliphatic alcohols, and sulfates and sulfonates of long chain alcohols may also be used in the flotation operation. However, the addition of a frother in operations of this type does not always bring about sufficient improvement to justify the additional expense of the frother.

Various modifications of the above described flotation steps may be employed. One modification comprises subjecting an aqueous slurry of the sized ore fraction to flotation using an anionic flotation reagent, recovering a concentrate rich in phosphate and subjecting an aqueous slurry of this concentrate to flotation with a cationic flotation reagent. More in detail, an aqueous slurry of ore having a particle size between about 14 mesh and about 200 mesh is admixed with an anionic collector and a modifier in the above described proportions and sufficient basic reagent to adjust the pH to between about 7.5 and about 9.5 and preferably between about 8 and about 9. The reagentized ore is subjected to froth flotation, whereby a major part of the phosphate is concentrated and recovered in the forth, and a major part of the silica is depressed and separated in the tailings fraction. The phosphate-containing froth is slurried with water and acidified to neutralize flotation reagents on the surface of the solids. Either inorganic mineral acids, such as sulfuric, hydrochloric and nitric acids, or organic acids, such as formic and acetic acids may be used to neutralize the solids. However, for reasons of economy, acids such as sulfuric and hydrochloric acids are normally employed. The solids in aqueous slurry form are further reagentized with a cationic collector and a basic reagent to adjust the pH to between about 7 and about 9. The reagentized slurry is subjected to froth flotation whereby the major part of the silica is removed in the froth, and the major part of the phosphate and compounds of iron and aluminum are depressed and recovered in aqueous slurry form from the tailing outlet of the flotation machine.

The flotation operation may be further modified to include at least one scavenger step and at least one cleaner step. In the scavenger step, tails from the anionic flotation step are reagentized again and refloated. The concentrate is combined with the concentrate obtained in the first anionic reagent flotation step. The tails from the first scavenger flotation may be reagentized again and floated to recover a concentrate that is also combined with the concentrate from the first anionic reagent flotation step. In the cleaner step part or all of the combined concentrate is refloated, with or without additional reagents, and the concentrate obtained from the first cleaner step may be refloated in a second cleaner step. The concentrate obtained from the second cleaner step is then subjected to flotation with a cationic reagent in the manner described above.

It will be recognized by those skilled in the art that separation of silica may also be accomplished in suitable tabling operations, spiraling operations and the like. In the case of Tennessee brown phosphate rock it is frequently possible to obtain a concentrate having in excess of about 72% BPL by screening and/or hydroclassifying the comminuted ore to produce an intermediate fraction, having a particle size, for example, between about —28 +150 mesh.

The aqueous slurry of phosphate rock concentrate produced by screening, hydroclassification, flotation, tabling or spiraling, as the case may be, is dewatered, the moist solids are heated to dryness, and then subjected to a magnetic field of high intensity. A high intensity magnetic separator, such as an induction roll type, having a flux density of at least about 25,000 maxwells per square inch and preferably between about 27,000 and about 100,000 maxwells per square inch, is used to effect the separation. The dried phosphate rock concentrate is passed through the high intensity magnetic field of the separator, whereby a magnetic fraction of the concentrate high in compounds of iron and aluminum is attracted to and retained by the separator. The non-attracted or non-magnetic fraction of the concentrate discharged from the separator is enriched with respect to phosphate content and is substantially lower in compounds of iron and aluminum than the feed to the separator. Preferably the non-magnetic fraction is passed through the high intensity magnetic field one or more times. If more than one passage through the magnetic field is made, the intensity of the magnetic field may be held constant for all passes, or the separation may be made with progressively higher or lower intensity fields on each pass. In addition, the separation may be made under conditions in which the intensity of the magnetic field is varied from pass to pass. The nature of the ore will determine the method of operation that will give an optimum separation.

The non-magnetic fraction produced in accordance with the instant novel process is a phosphate rock concentrate having a BPL content in excess of about 72% by weight, and a combined weight of iron and aluminum, as $Fe_2O_3$ and $Al_2O_3$, of less than 4% by weight.

In another embodiment of the invention a phosphatic ore, such as Senegal phosphate ore, is comminuted to effect substantial liberation of phosphatic values, and the ore is slurried with water. The slurry is subjected to strong agitation to disperse aggregates of the ore and then screened to separate coarse pebble from the aqueous slurry of fine solids. The size of the screen used in this separation is between about 8 and about 20 mesh, and preferably between about 12 and about 16 mesh. Coarse pebble separated in the screening step is heated to dryness and comminuted to pass a 20 mesh screen and then subjected to a high intensity magnetic separation in a suitable magnetic separator having a field intensity in excess of about 25,000 maxwells per square inch. The non-magnetic fraction or component is suitable for use as acidulation grade phosphate rock, and the magnetic fraction may be used as a direct application fertilizer if desired.

Fine solids from the screening step, in aqueous slurry form, are passed through a hydroseparator or other suitable size classifying apparatus to effect a further separation of solids at a size between about 100 and about 325 mesh. Coarse solids discharged from the underflow of the hydroseparator as an aqueous slurry are further separated by means of a hydroseparator or other suitable size classifying apparatus to effect a size separation at between about 28 and about 48 mesh. Solids recovered from the latter separation, having a maximum particle size of between about 8 and about 16 mesh and a minimum particle size of between about 28 and about 48 mesh, are slurried with water, reagentized with a suitable collector, a froth modifier, and a basic reagent to adjust the pH of the slurry to between about 7.5 and about 9.5, and then subjected to separation in a spiral separator. Solids comprising the tailing fraction from the spiral separator, which contain a major portion of the silica, are discarded. Solids comprising the concentrate fraction from the spiral concentrator are dewatered, heated to dryness, and then subjected to high intensity magnetic separation as described above. Th non-magnetic fraction from the magnetic separator contains in excess of 72% BPL and less than 4% by weight of combined $Fe_2O_3$ and $Al_2O_3$. The magnetic fraction of the spiral concentrate may be used as a direct application fertilizer.

Solids from the latter size separation step, having a maximum particle size of between about 28 mesh and about 48 mesh, and a minimum particle size between about 100 and about 325 mesh are slurried with water and reagentized with a suitable collector, a froth modifier, and sufficient basic reagent to adjust the pH of the slurry, and then subjected to froth flotation. Anionic flotation is carried out at a pH between about 7.5 and about 9.5, and cationic flotation is carried out at a pH of between about 7.0 and about 9.0. Solids comprising the tailing fraction from the flotation step, which contain a major portion of silica, are discarded. The concentrate fraction, which contains a major portion of the phosphate, is dewatered, heated to dryness, and subjected to high intensity magnetic separation. The non-magnetic fraction contains in excess of 72% BPL and less than 4% by weight of combined $Fe_2O_3$ and $Al_2O_3$. The magnetic fraction may be used as a direct application fertilizer.

The slurry of solids having a maximum particle size of between about 100 mesh and about 325 mesh from the first hydroseparator is passed through one or more cyclone separators whereby a size separation is made at about 35 microns. Overflow from the cyclone separator, which contains particles smaller than about 35 microns is discharded, or may be spray dried if desired to produce a phosphatic material suitable for use as a direct application fertilizer. Underflow from the cyclone separator is subjected to froth flotation as described above to produce a tailing fraction containing a major portion of the silica and a concentrate fraction containing a major portion of the phosphate values. The tailing fraction is discarded. The concentrate fraction is dewatered, heated to dryness, and subjected to a high intensity magnetic separation as described above. The non-magnetic fraction contains in excess of 72% BPL and less than 4% by weight of combined $Fe_2O_3$ and $Al_2O_3$. The magnetic fraction may be used as a direct application fertilizer.

Non-magnetic fractions recovered in the high intensity magnetic separation of the spiral concentrate and the flotation concentrates may be combined for use in the preparation of superphosphate, triple superphosphate, phosporic acid and other fertilizer materials.

As illustrative of the instant novel process, but in nowise intending to be limited thereby, the following examples are described. All parts and percentages are by weight unless otherwise specified. The term "Insol." as used in the examples refers to material insoluble in boiling aqueous hydrochloric acid solution (1:1 HCl).

EXAMPLE 1

White phosphate rock from the vicinity of Pine View, Perry County, Tennessee, was comminuted to pass a 35 mesh screen, slurried with water, agitated for about 10 minutes, and then screened on a 200 mesh screen. Chemical analyses of the ore and the —35 +200 mesh fraction were as follows:

| Component | Proportion, percent | |
|---|---|---|
| | Ore | —35 +200 mesh |
| BPL | 54.4 | 54.6 |
| Insol | 26.7 | 26.3 |
| $Fe_2O_3$ | 4.9 | 5.4 |
| $Al_2O_3$ | 1.5 | 1.3 |
| $CO_2$ | 1.4 | |
| $F_2$ | 2.2 | |
| Weight | | 84.4 |

A portion of the —35 +200 mesh fraction (919 parts) was slurried with water at about 70% solids, and agitated with tall oil (2.2 pounds per ton of solids), kerosene (2.2 pounds per ton of solids), Bunker C fuel oil (4.4 pounds per ton of solids), and sodium hydroxide (0.54 pound per ton of solids). The reagentized slurry, having a pH of 8.2, was subjected to froth flotation, and the froth, containing the major portion of the phosphate values, was collected. Solids comprising the phosphate flotation concentrate were slurried with water at about 65% solids and acidified with sulfuric acid (8 pounds per ton of solids) to remove reagents adhering to the surface of the solids. Liquids was then decanted and the solids were washed with water to remove excess acid. The washed solids were slurried with water at about 70% solids and agitated with a primary amine acetate derived from tallow fatty acids, sold commercially under the trade mark ARAMAC-T (0.40 pound per ton of solids), kerosene (1.2 pounds per ton of solids), and sodium hydroxide (0.48 pound per ton of solids). The reagentized slurry, having a pH of about 7.7, was subjected to froth flotation. The major portion of silica in the feed was floated off in the froth, while the major portion of phosphate values was depressed and recovered as a slurry from the underflow section of the flotation machine. The phosphate concentrate was dewatered and dried at about 250° F. for about 6 hours. Chemical analyses of the flotation concentrate were as follows:

Component: Proportion, percent
 Weight of flotation feed _____ 46.0
 BPL _____ 77.4
 Insol. _____ 3.3
 $Fe_2O_3$ _____ 3.3
 $Al_2O_3$ _____ 1.2

A high intensity induction roll magnetic separator, Carpco standard laboratory model M-12, having a magnet 1.5 inches in length, was used to separate compounds of iron and aluminum from the dry flotation concentrate. The above described flotation concentrate was fed to the separator at the rate of between about 0.32 to about 0.43 ton per hour per foot of magnet length per pass. The first pass was carried out at about 0.75 ampere, which was equivalent to a field intensity of about 40,000 maxwells per square inch. The non-magnetic fraction from the first pass was subjected to a second pass carried out at about 1.8 amperes, which was equivalent to a field intensity of about 90,000 maxwells per square inch. Chemical analyses and weight distribution of the products of the magnetic separation were as follows:

| Fraction | Proportion, percent | | | | |
|---|---|---|---|---|---|
| | Weight | BPL | Insol. | $Fe_2O_3$ | $Al_2O_3$ |
| Non-magnetic | 83.0 | 80.2 | 3.1 | 0.9 | 1.2 |
| Magnetic-first pass | 9.0 | 53.0 | 12.4 | 24.2 | 3.0 |
| Magnetic-second pass | 8.0 | 73.7 | 6.0 | 4.5 | 1.8 |

The non-magnetic fraction was a superior grade of phosphate rock concentrate which contained 80.2% BPL, well above the minimum level of 72% BPL. In addition, the combined weight of iron and aluminum oxides was 2.1%, well below the maximum level of 4.0%.

EXAMPLE 2

A portion of the −35 +200 mesh fraction of Example 1 (872 parts) was slurried with water at about 70% solids, and agitated with tall oil (1.7 pounds per ton of solids), kerosene (1.7 pounds per ton of solids), Bunker C fuel oil (3.4 pounds per ton of solids), and sodium hydroxide (0.52 pound per ton of solids). The reagentized slurry having a pH of about 8.2 was then subjected to froth flotation. The froth containing the major portion of phosphate values was collected, dewatered, and heated to dryness. The dry solids were then subjected to high intensity magnetic separation, using the procedure and apparatus of Example 1. Chemical analyses and weight distribution of the flotation concentrate and the products of the magnetic separation are as follows:

| Component | Weight | BPL | Insol. | $Fe_2O_3$ | $Al_2O_3$ |
|---|---|---|---|---|---|
| Flotation Concentrate percent | 100 | 73.2 | 6.1 | 4.5 | 1.5 |
| Non-magnetic fraction do | 73 | 78.5 | 6.5 | 0.9 | 0.7 |
| Magnetic fraction, first pass do | 14 | 51.4 | 18.5 | 19.3 | 6.7 |
| Magnetic fraction, second pass do | 13 | 74.2 | 7.2 | 3.2 | 1.3 |

The non-magnetic fraction prepared in this example was an acceptable phosphate rock concentrate which met the specifications of the industry with respect to proportions of phosphate and oxides of iron and aluminum.

EXAMPLE 3

Phosphate rock from Senegal, French West Africa, was slurried with water and screened on a 28 mesh and a 200 mesh screen. Solids retained on the 200 mesh screen were washed with water to remove −200 mesh solids adhering to the coarse solids. Chemical analyses of the deslimed −28 +200 mesh solids were as follows:

| Component: | Proportion, percent |
|---|---|
| BPL | 63.04 |
| Insol. | 23.42 |
| $Al_2O_3$ | 1.69 |
| $Fe_2O_3$ | 1.96 |

The solids were divided into two equal portions designated as portion A and portion B, respectively. Portion A was slurried with water, reagentized with tall oil (1.2 pounds per ton of solids), kerosene (1.2 pounds per ton of solids), Bunker C fuel oil (2.4 pounds per ton of solids), and sufficient sodium hydroxide to adjust the pH of the slurry to about 8.2. The reagentized slurry was subjected to a "rougher" flotation step and the concentrate and tails produced thereby were recovered. The "rougher" concentrate was refloated in a "cleaner" flotation step, and the "cleaner" concentrate and tails were recovered. The "cleaner" tails were combined with the "rougher" tails, slurried with water and reagentized with tall oil (0.3 pound per ton), kerosene (0.3 pound per ton), and Bunker C fuel oil (0.6 pound per ton). The reagentized slurry was then subjected to a "scavenger" float. Concentrate recovered from the "scavenger" float was subjected to a "cleaner" float in the same manner as the "rougher" concentrate. The concentrates produced in each "cleaner" flotation step were combined, dewatered, heated to dryness and subjected to separation in a high intensity magnetic field, using the apparatus and procedure of Example 1.

For purposes of comparison, portion B was heated to dryness, subjected to high intensity magnetic separation in the same manner as the flotation concentrate of portion A, and the resulting non-magnetic fraction was then subjected to froth flotation in the same manner as portion A.

Chemical analyses of the fractions produced by the above described treatment of portions A and B were as follows:

*Portion A.—Flotation Followed by Magnetic Separation*

| Component | Proportion, percent | | | | BPL Recovery, percent |
|---|---|---|---|---|---|
| | BPL | Insol. | $Al_2O_3$ | $Fe_2O_3$ | |
| Concentrate | 81.61 | 4.15 | 0.80 | 0.70 | 87 |
| Magnetic Fraction | 67.73 | 7.26 | 6.83 | 6.83 | 8 |
| Flotation Tails | 9.99 | 83.53 | 2.31 | 3.20 | 4 |
| Slimes | 43.26 | 28.20 | 6.50 | 10.90 | 1 |

*Portion B.—Magnetic Separation Followed by Flotation*

| Component | Proportion, percent | | | | BPL Recovery, percent |
|---|---|---|---|---|---|
| | BPL | Insol. | $Al_2O_3$ | $Fe_2O_3$ | |
| Concentrate | 82.70 | 2.77 | 0.54 | 0.61 | 76.9 |
| Magnetic Fraction | 58.99 | 11.79 | 7.97 | 13.0 | 10.7 |
| Flotation Tails | 25.35 | 68.67 | 1.59 | 0.52 | 11.7 |
| Slimes | 43.26 | 28.20 | 6.50 | 10.90 | 0.7 |

Comparison of the results obtained by the above described treatment of portions A and B shows that flotation followed by high intensity magnetic separation results in a substantially improved recovery of phosphate values. The concentrate produced by the treatment of portion A contained 87% of the BPL originally present in the −28 +200 mesh fraction of the ore, while the concentrate produced by the treatment of portion B contained only 77% of the original BPL.

Having thus fully described and illustrated the invention, what is desired to be secured and claimed by Letters Patent is:

1. A method of beneficiating phosphate rock containing silica, and aluminum and iron compounds which comprises comminuting the ore to effect substantial liberation of phosphatic values, slurrying the comminuted ore with water, hydroclassifying the ore to separate coarse solids from fine solids, said coarse solids having a minimum particle size of between about 100 and about 325 mesh, subjecting said coarse solids to froth flotation, recovering a phosphate concentrate from which a major portion of the silica in said comminuted ore has been removed, heating said concentrate to dryness, subjecting the dry concentrate to a magnetic field having an intensity in excess of about 25,000 maxwells per square inch, whereby a magnetic fraction containing a major portion of the compounds or iron and aluminum is separated from the non-magnetic fraction, and recovering said non-magnetic fraction rich in phosphate values and low in compounds of iron and aluminum.

2. The process of claim 1 wherein said froth flotation is effected by reagentizing the slurry of coarse solids with an anionic froth collector, a froth modifier, and a basic reagent to adjust the pH of the slurry to between about 7.5 and about 9.5.

3. The process of claim 1 wherein said froth flotation is effected by reagentizing the slurry of coarse solids with a cationic froth collector, a froth modifier, and a basic reagent to adjust the pH of the slurry to between about 7 and about 9.

4. The process of claim 1 wherein said froth flotation is effected by reagentizing the slurry of coarse solids with an anionic froth collector, a froth modifier, and a basic reagent to adjust the pH of the slurry to between about 7.5 and about 9.5, separating the resulting froth from the slurry, slurrying the froth with an aqueous solution of sulfuric acid, whereby flotation reagents are removed from the solids, washing the solids with water until substantially free of acid, slurrying the washed solids with water, reagentizing the solids with a cationic froth collector, a froth modifier, and a basic reagent to adjust the pH of the slurry to between about 7 and about 9.

References Cited in the file of this patent

UNITED STATES PATENTS

| | | |
|---|---|---|
| 1,999,825 | Saklatwalla | Apr. 30, 1935 |
| 2,352,324 | Hubler | June 27, 1944 |
| 2,753,997 | Duke et al. | July 10, 1956 |

OTHER REFERENCES

Taggart: "Handbook of Mineral Dressing," John Wiley and Sons, Incorporated, 1954, page 10–08.